United States Patent
Wells

(10) Patent No.: US 7,068,722 B2
(45) Date of Patent: Jun. 27, 2006

(54) CONTENT ADAPTIVE VIDEO PROCESSOR USING MOTION COMPENSATION

(75) Inventor: Aaron Wells, Oakland, CA (US)

(73) Assignee: LSI Logic Corporation, Milpitas, CA (US)

( * ) Notice: Subject to any disclaimer, the term of this patent is extended or adjusted under 35 U.S.C. 154(b) by 643 days.

(21) Appl. No.: 10/256,190

(22) Filed: Sep. 25, 2002

(65) Prior Publication Data

US 2004/0057517 A1  Mar. 25, 2004

(51) Int. Cl.
*H04B 1/66* (2006.01)

(52) U.S. Cl. .......................... 375/240.16; 375/240.29; 375/240.15; 375/240.25; 375/240.26; 375/240.27; 382/238; 382/236; 382/233; 382/235; 341/94; 341/51; 348/135

(58) Field of Classification Search ........... 375/240.16, 375/240.29, 240.15, 240.25, 240.26, 240.27; 382/238, 236, 233, 235; 341/94, 51; 348/135
See application file for complete search history.

(56) References Cited

U.S. PATENT DOCUMENTS

| 5,600,731 | A | 2/1997 | Sezan et al. |
| 6,301,440 | B1 * | 10/2001 | Bolle et al. ................. 396/128 |
| 6,404,361 | B1 * | 6/2002 | Andrews et al. .............. 341/94 |
| 6,462,791 | B1 * | 10/2002 | Zhu ...................... 375/240.27 |
| 6,744,924 | B1 * | 6/2004 | Hannuksela et al. ......... 382/232 |
| 6,909,745 | B1 * | 6/2005 | Puri et al. .............. 375/240.01 |

* cited by examiner

Primary Examiner—Shawn S. An
(74) Attorney, Agent, or Firm—Sawyer Law Group LLP

(57) ABSTRACT

A system and method for providing a method for reducing artifacts in a video sequence of image frames is disclosed. The method and system include classifying scenes in the sequence of image frames, analyzing the content of the image frames and performing temporal filtering on the image frames. The method and system further include applying a set of rules to results of the classification and the content analysis to adapt characteristics of the temporal filtering for the scene.

30 Claims, 5 Drawing Sheets

| Capture | Pre-Process | Motion Estimation | Encoding | Loop TF |
|---|---|---|---|---|
| P5  | B4  | B0 | I2 | --- |
| B6  | P5  | B1 | B0 | B0 |
| B7  | B6  | P5 | B1 | B1 |
| P8  | B7  | B3 | P5 | I2 |
| B9  | P8  | B4 | B3 | B3 |
| B10 | B9  | P8 | B4 | B4 |
| B11 | B10 | B6 | P8 | P5 |

Display Order:

Encoding Order:

Filtering
Order:  P14      B0      B1      I2      B3      B4      P5      B6

CONTENT ADAPTIVE VIDEO PROCESSOR USING MOTION COMPENSATION

FIELD OF THE INVENTION

The present invention relates to video compression and decompression methods, and more particularly to content adaptive temporal filtering using scene classification.

BACKGROUND

Digital video and digital video compression has become ubiquitous throughout the content generation, distribution, broadcast, editing, and storage markets. The dominant compression schemes are block-based (MPEG2, MPEG1, DV, MPEG4) and 'lossy'.

The basic idea behind video compression is to remove information redundancy, spatial within a video frame and temporal between video frames. As in JPEG, a standard for still image compression, DCT-based (Discrete Cosine Transform) compression is frequently used to reduce spatial redundancy. Because the images in a video stream usually do not change much within small time intervals the content of one video frame can be predicted from others temporally close to it. This technique, motion compensation, is used in standards such as MPEG to achieve greater compression ratios.

A video stream is a sequence of video frames. Each frame is a still image. A video player displays one frame after another, for example at a rate close to 30 frames per second in North America. In MPEG, digitized frames are divided into 16×16 pixel macroblocks, and are numbered in scan order (top left to bottom right) and are the units for motion-compensated compression. A block is a general term that also refers to 8×8 resgions as well.

Frames can be encoded in three types: intra-frames (I-frames), forward predicted frames (P-frames), and bi-directional predicted frames (B-frames). Non-intra frames are encoded using information from outside the current frames that has already been encoded. There are two types of non-intra frames, predicted frames (P-frames) and bi-directional frames (B-frames). In non-intra frames, motion compensated information can be used for a macroblock, which results in less data than directly (intra) encoding the macroblock. B and P pictures can contain some or all intra blocks.

An I-frame is spatially encoded as a single image, with no reference to any past or future frames. The encoding scheme used is similar to JPEG compression. Each 8×8 block in the frame is encoded independently with the exception of a DC coefficient. The block is first transformed from the spatial domain into a frequency domain using the DCT (Discrete Cosine Transform), which separates the signal into independent frequency bands. For human perception, the most sensitive frequency information is in the upper left corner of the resulting 8×8 block. After this, the data is quantized. Quantization can be thought of as ignoring lower-order bits (though this process is slightly more complicated). Quantization is the only lossy part of the whole compression process other than subsampling.

After the I-frame has been processed, the encoded frame will be reconstructed and stored to provide a reconstructed version of the image identical with the one that will be generated by the decoder. This reconstructed image is used as a reference frame to encode non-intra frames.

A P-frame is encoded relative to the past reference frame, which can be an I- or P-frame. In MPEG2, the past reference frame is the closest preceding reference frame. [Note: in H.264, aka MPEG4 part 10, additional previous reference pictures can be used.] As an illustration, an encoder might, before performing DCT, compare each macroblock with the same block in the reference image. If the block is part of a static background, it will be very similar to the corresponding block in the reference image. The encoder will generate a difference signal from the predictor and the current macroblock, and encode the difference signal in the output bitstream. The decoder is instructed to decode the difference signal and add the corresponding block from the reference image. Similarly, if the block is part of motion in the scene, then the block may still be present in the reference image, just not is the same location. A motion vector is used to instruct the encoder where in the reference image to get the data, typically using a value having x and y components. The process of obtaining the motion vector is known as motion estimation, and using the motion vector to eliminate or reduce the effects of motion is known as motion compensation.

For bi-directional encoding, a B-frame is encoded relative to a past reference frame, a future reference frame, or both frames. This way, a motion vector should be found for almost every macroblock in the B-frame. [See note on H.264] The encoding for B-frames is similar to P-frames, except that motion vectors may refer to areas in the future reference frames. For macroblocks that use both past and future reference frames, the two 16×16 areas are averaged.

FIG. 1 is a diagram showing a conventional example of an encoding pattern and dependencies between I-, P-, and B-frames. The diagram shows a typical group of pictures (GOP) IPB sequence that starts with an I-frame. The I- and P-frames are sometimes called anchor frames because they are used in the coding of other frames using motion compensation. The arrows represent the inter-frame prediction dependencies. The first P-frame is coded using the previous I-frame as a reference. Each subsequent P-frame uses the previous P-frame as its reference. Thus, errors in P-frames can propagate because the P-frame becomes the reference for other frames. B-frames are coded using the previous I- or P-frame as a reference for forward prediction, and the following I- or P-frame for backward prediction.

Frames do not need to follow a static IPB pattern. Each individual frame can be of any type. Often, however, a regular IPB sequence where there is a fixed pattern of P- and B-frames between I-frames is used throughout the entire video stream for simplicity. Regular GOPs are characterized by two parameters, M and N. M represents the distance between I-frames, and N is the distance between P-frames (or closest anchor frames). A value of M=1 means that there are no B-frames.

B-frames can usually be decoded only if both the preceding and following anchor frames have been sent to the decoder. The exception is that MPEG 2 has "closed GOP B pictures" in which only the following reference picture is required for decoding. FIG. 1 shows the GOP in display order, but to enable decoding, the order of the frames in the output sequence is rearranged in a way that a decoder can decompress the frames with minimum frame buffering. For example, an input sequence of IBBPBBP will be arranged in the output sequence as IPBBPBB. If there are no B-frames, then reordering is unnecessary.

Depending on the compression ratio and characteristics of the content, various compression artifact signatures can be introduced from this processing. For example, image motion, such as rotations and zooms may not be predicted efficiently and may load the system. Also brightness changes, shadows, and fades may result in poor prediction. Blocking artifacts result from a coarsely quantized DCT system. If there are insufficient bits available, block structures may become visible, resulting in visually perceptible rectilinear boundaries. 'Mosquito' noise is a characteristic of quantized DCT systems and appears on sharp edges in the scene, such as titles. Additionally, impairments characteristic of analog video distribution and storage (random noise, scan line corruption) are present as well. As bit rates decline, consumer digital video recording devices, such as time-shift and DVD-record devices become prevalent, and display sizes increase, these artifacts become more noticeable and a greater degree of suppression is required.

Typically, an MPEG, DV, or other decoder performs a scaling operation prior to display. Newer compression schemes such as MPEG4, H.26L, and H.263+, as well as older, low bit rate standards such as H.261 can apply deblocking filters to reduce the effects of the DCT block boundary artifacts as well.

Deblocking filters are spatial pixel operations that improve subjective quality by removing blocking and mosquito artifacts. These are either normative (H.261, H.263+) or non-normative (e.g. MPEG4). Normative deblocking filters are referred to as being inside the coding loop because predicted pictures are computed based on filtered versions of the previous ones. Normative ('Loop') filters are, in general, more effective in that they run both in the encoder and decoder. Non-normative deblocking filters are run after decode only and outside the coding loop. Therefore, prediction is not based on the post filtered version of the picture.

Temporal filtering is another approach for noise reduction. Temporal filters help remove the background graininess and noise that is often apparent in lower-quality input images, making the material easier to encode. There are two major temporal-domain approaches to image sequence filtering: (1) the motion-compensation approach, and (2) the motion-detection approach. In motion-compensated filtering, first a motion estimation algorithm is applied to the noisy image sequence to estimate the motion trajectories, i.e., locations of pixels (or subpixels) that correspond to each other at a predetermined number of nearby image frames. Then, the value of a particular pixel at a certain frame is estimated using the image sequence values that are on the motion trajectory passing through that pixel.

In contrast, methods based on motion detection do not attempt to estimate the interframe motion. Instead, direct differences of pixel values at identical spatial locations of two adjacent frames are computed to detect the presence of interframe motion.

In temporal filtering, the filtered pixel value at a certain location of the present frame is determined by applying a (typically nonlinear) finite impulse response (FIR) or infinite impulse response (IIR) filter structure to the unfiltered and estimated pixels. The filter coefficients are often functions of the difference between the pixel value of interest in the present frame and the pixel value at the same location of the previous frame.

The artifacts most readily suppressed by temporal filtering include 'mosquito' noise around text overlays and sharp edges, intra-frame beating, stationary texture crawling, and visible block boundaries. However, temporal filters have not been applied in conventional compression loops or within the loop in post processing for various reasons, including system complexity, and IDCT mismatch control: MPEG, for instance, does not specify an exact transform, so IIR loop filters would allow encoder/decoder drift to accumulate (Note: newer compression schemes like WMV and H.264 specify the transform exactly and do not suffer from this problem.)

Accordingly, what is needed is an improved method and system for reducing encoding artifacts in a video sequence of image frames. The present invention addresses such a need.

SUMMARY OF THE INVENTION

The present invention provides a method and system for providing a reduction of artifacts in a video sequence of image frames. The method and system include classifying scenes in the sequence of image frames, analyzing the content of the image frames, and performing spatial and temporal filtering on the image frames. The method and system further include applying a set of rules to results of the classification and the content analysis to adapt characteristics of the temporal filtering for the scene.

According to the system and method disclosed herein, the present invention utilizes scene classification to supply control input to a temporal filter to modify the behavior of the temporal filtering according to current characteristics of the content, thereby more effectively reducing artifacts in the image sequence. In addition, the temporal filtering may be applied in the encoding system and/or the decoding system, and in or out of the encoding and decoding loops.

DETAILED DESCRIPTION

The present invention relates to video processing techniques for removing encoding artifacts. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The compressed video produced in a digital set top box or DVD player often contains compression artifacts, which are particularly noticeable on large displays. The present invention improves image quality of the video by employing motion compensated techniques during a video "post-decode" processing stage for temporal filtering for noise and compression artifact reduction. More particularly, the present invention provides a content adaptive temporal filter whose behavior is modified according the type of scene detected by a scene classifier.

Figure 1:
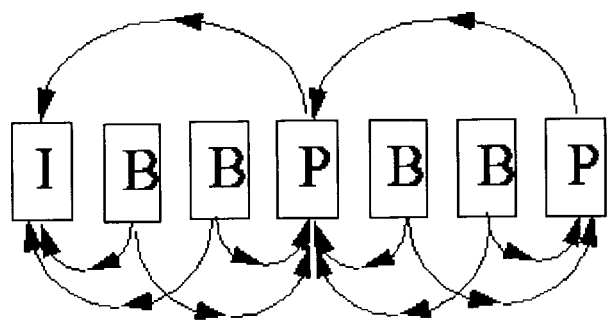
FIG. 1 is a diagram showing a conventional example of an encoding pattern and dependencies between I-, P-, and B-frames.
Figure 2:
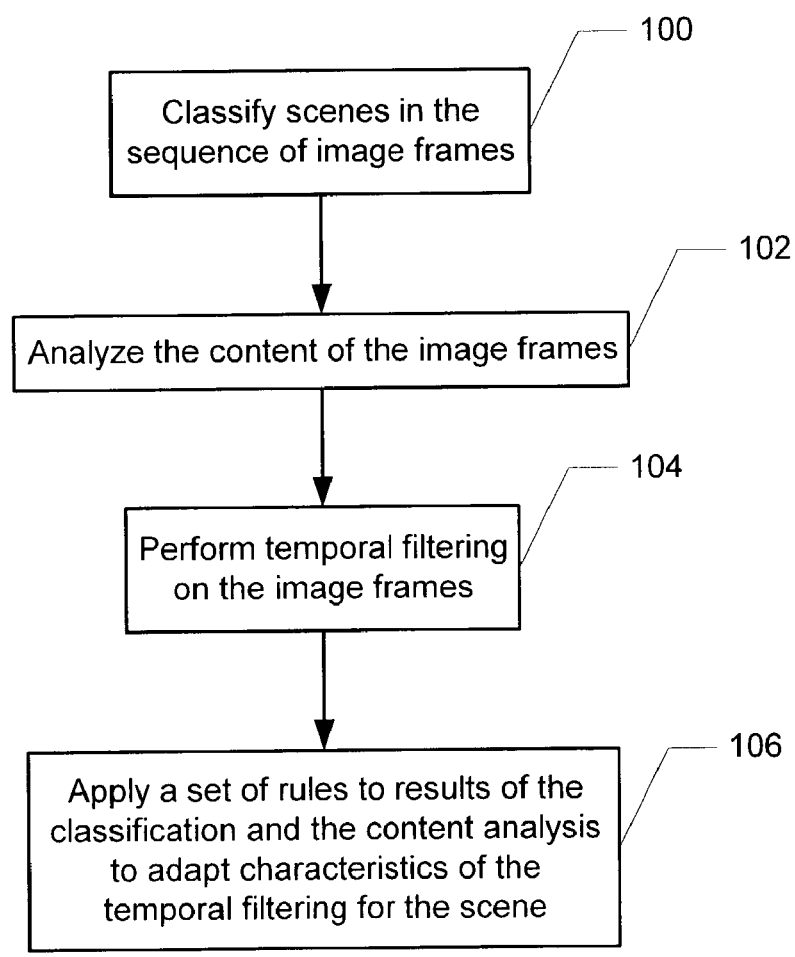
FIG. 2 is a flow diagram illustrating a process for reducing encoding artifacts in a video sequence of image frames in a preferred embodiment of the present invention.

FIG. 2 is a flow diagram illustrating a process for reducing encoding artifacts in a video sequence of image frames using content adaptive temporal filter in a preferred embodiment of the present invention. The process begins in step 100 by classifying scenes in the sequence of image frames, and analyzing the content of the image frames in step 102. In step 104, temporal filtering is performed on the image frames. In step 106, a set of rules is applied to results of the classification and the content analysis to adapt characteristics of the temporal filtering for the scene. According to the present invention, scene classification is used to supply control input to the temporal filter to modify the behavior of the temporal filtering according to current characteristics of the content, thereby more effectively reducing artifacts in the image sequence. In addition, the temporal filtering may be applied in the encoding system and/or the decoding system, as explained below.

Figure 3:
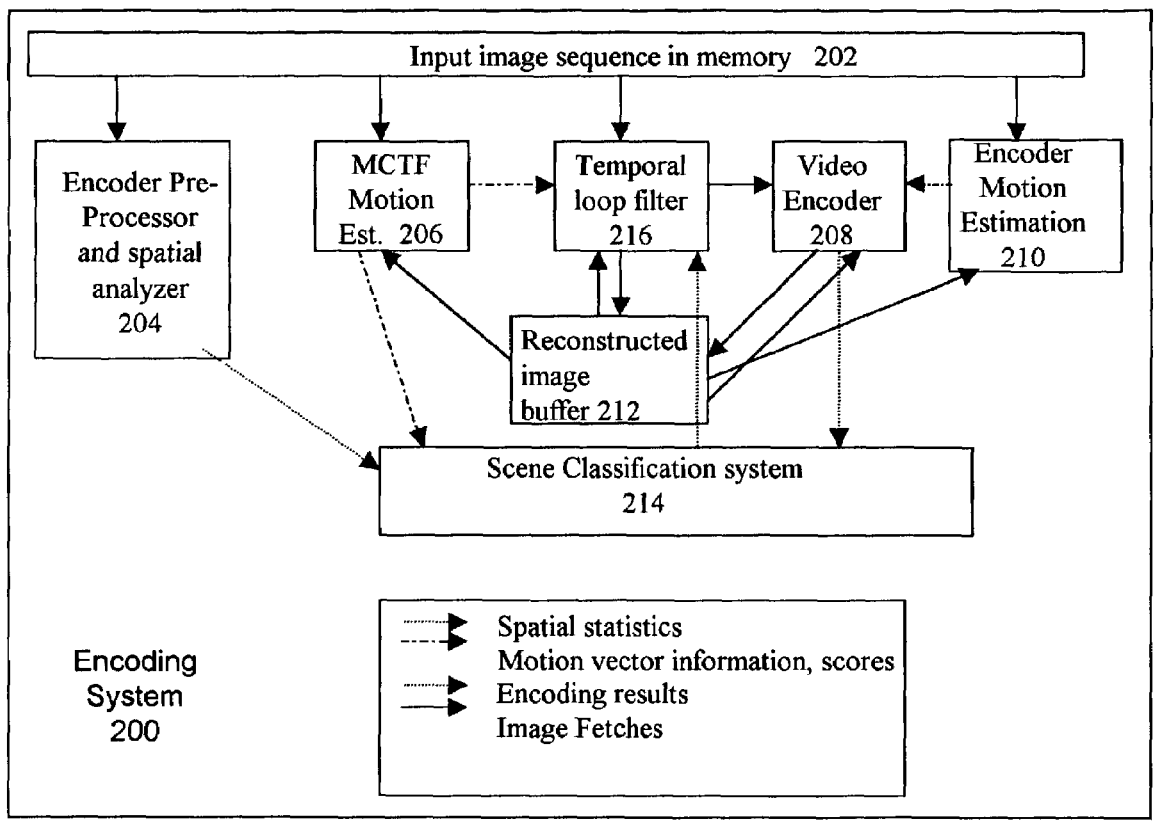
FIG. 3 is a block diagram illustrating an encoding system having a temporal loop filter in accordance with the present invention.

FIG. 3 is a block diagram illustrating an encoding system having a temporal loop filter in accordance with the present invention. The encoding system 200 includes an encoder pre-processor and spatial analyzer 204, a motion compensated temporal filter (MCTF) motion estimator 206, a video encoder 208, an encoder motion estimator 210, and a reconstructed image buffer 212. In accordance with the present invention, the encoding system 200 further includes a scene classification system 214 and a temporal loop filter 216, which is coupled between the motion estimator 206 and the video encoder 208.

The encoder pre-processor 204 spatially analyzes the image frames of an input video image sequence 202 stored in memory. If the frame is an I-frame, then the video encoder 208 encodes the frame with no reference to any past or future frames. The video encoder 208 also decodes the encoded frames and stores reconstructed pictures in the reconstructed image buffer 212.

According to one aspect of the present invention, the motion estimator 206, the temporal loop filter 216, the video encoder 208, and the reconstructed image buffer 212 form the encoder reconstruction loop, where the temporal loop filter 216 writes filtered images back into the reconstructed reference image buffer 212. The video encoder 208 then uses the filtered reconstructed images as reference frames to encode non-intra frames. In the preferred embodiment, the motion estimator 210 also uses the temporally filtered images. An alternative is to have the motion estimator 210 utilize reconstructed but not filtered images during motion estimation, but still have the encoder 208 use the filtered reconstructed images for generating a compressed bitstream.

According to a further aspect of the present invention, the scene classification system 212 includes a set of rules that control how particular types of scenes are filtered to adapt to the content. The temporal loop filter 216 is content adaptive because the scene classification system 214 first classifies the scene, applies the rules to the results of the classification and the content analysis, and adapts the characteristics of the filtering accordingly.

The scene classification system 214 takes statistics about the image sequence from the pre-processor/spatial analyzer 204, the motion estimator 206, and the encoder 208. It uses this new information and information from previous pictures to classify the scene type, and to identify scene cuts, and scene transitions. The scene classification system 214 then generates control input to the temporal loop filter 216 to modify its behavior according to the current characteristics of the content.

As an example of the system in operation, assume that the current scene has a sudden change in illumination, which is represented as a sudden change in DC levels (brightness). Typically, this can cause problems for temporal filters and cause a stair step effect in the displayed video, instead of a continuous increase or decrease in brightness. According to the present invention, the scene classification system 214 would have rules for how to handle changes in DC values. For example, if the change in DC values fall with a particular threshold level, then the strength of the filter may be changed accordingly. It should be noted that the decoder must apply the same rules, as explained further below.

In a preferred embodiment, the scene classification system is used to adapt and vary the strength of temporal filter according to scene or picture type of the current frame. Examples of scene types identified by the scene classification system 214 may include fades, dark, stills, film (3:2 pull-down or progressive), high frequency, flat, text overlay, zooms, pans, flashes, and high motion. Temporal metrics may include motion vector field consistency, vector length, motion compensation 'score', mean and variance of motion vectors, and zero-displacement field difference. Spatial metrics may include DC value, minimum and total localized frequency content ('activity') edge detection. These metrics are used to adapt the temporal filtering for each block in the frame in order to apply stronger or weaker filtering (e.g. stronger filtering across intra pictures to eliminate 'intra frame beating' of MPEG2).

For example, the default might be to filter all blocks using 50% of the block in the current frame with 50% of the block in the reference frame. However, if the two blocks are very different, e.g., the motion vector is not effective because of uncovered motion, then only the current frame should be used, and no filter is applied. If the blocks are very similar and the only difference is caused by noise, then a much stronger filter may be used by using more of the block in the reference frame, eliminating intra frame beat on the next I-frame.

In a preferred embodiment, spatial, temporal, and motion metrics for scene classification are also used to adapt the behavior of various post-processing filters, including temporal or MCTF, and also MC de-interlacing filter, spatial deblocking and MC error concealment, depending on the scene characteristics of the video content (as opposed to or in addition to a local neighborhood 'blockiness' metric). The behavior of the temporal, spatial, deblocking, de-interlacing and error concealment filters (MC or non-MC; loop or otherwise) may also be adapted based on detecting scene discontinuities and transitions and across the transitions. For instance, temporal filtering of any type could be turned off across scene cuts. For bi-directional temporal filtering, only the temporal filter direction that crosses the scene cut may be turned off. Filter strength may be made stronger or weaker after a scene cut, when temporal filtering resumes.

Figures 4, 5:
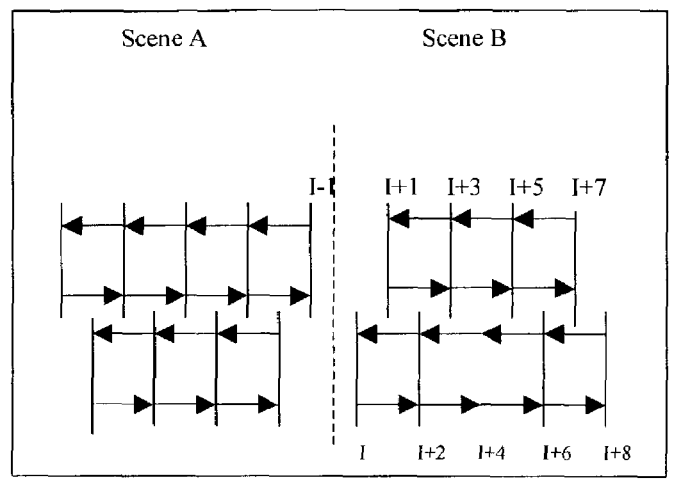
FIG. 4 is a diagram of a portion of a video sequence showing temporal prediction interruption at a scene cut.
FIG. 5 is a table showing each stage of the encoding system pipeline during the processing of a portion of a video sequence with two B-pictures.

FIG. 4 is a diagram of a portion of a video sequence showing temporal prediction interruption at a scene cut. Scenes A and B are shown comprising multiple image frames, scene A ending at field I-1 and scene B beginning with frame I. The Figure represents an interlaced video sequence, e.g., field I and I+1 are one-half of the same frame. In the case of progressive sequences, fields I+2n and I+2N+1 are co-incident in time.

In a preferred embodiment, bi-directional directional temporal filtering is applied during video processing. Forward infinite impulse response (IIR) temporal filtering is shown by left arrows, and backward finite impulse response (FIR) temporal filtering, shown by right arrows. Typically, the forward direction is IIR and the backward direction is finite-impulse response FIR, although the forward direction could also be FIR.

As shown, the temporal filtering is interrupted at the scene cut. Note that each picture in the neighborhood of the scene cut is still filtered in one direction. If forward IIR filtering only is applied, fields I and I+1 are not filtered. In addition, filter strength may be adjusted from scene 'A' settings at scene boundaries due to scene change and/or classification of Scene 'B'.

As has just been described, the present invention applies temporal filtering within the encoding loop, and more particularly, motion compensated temporal filtering (MCTF), to reduce encoding artifacts. In a preferred embodiment, the temporal filtering is applied within the encoding loop for bi-directional video compression schemes that utilize B-pictures. However, the present invention may also be used without B-pictures ('M=1' or non-reordered compression), and applying the adaptive temporal filtering to I-pictures.

With temporal filtering being placed into the encoding loop, it must be specified for decoding how temporal filtering is used to derive the motion vectors. There are three ways this may be accomplished. The first method is for the encoding system to send MCTF vectors in the bitstream to the decoder for loop temporal filtering. This method has the advantage that it eliminates the need for the decoder to perform motion estimation to derive the vectors, making the encoder less expensive. The disadvantage is that more information needs to be sent in the bitstream.

In the second method, the encoding system specifies motion vector search and compensation algorithm and does not convey vectors. In the third method, the encoding system derives vectors from other motion vectors (e.g., concealment motion vectors, or MPEG B-picture and P-picture compression motion vectors). This method requires that the decoder implement the same rules as the encoder to derive these vectors for temporal filtering.

In further embodiments, the encoding system may convey a pan vector or vectors for bi-directional or multi-reference prediction to the decoder for 24 to 30 Hz temporal interpolation for judder reduction. In addition, the encoder may also convey scene classification information indicating whether the current scene is a pan.

Random access (e.g., channel change) and error recovery in transmitted streams is impacted by in-the-loop MCTF. As shown in FIG. 4, scene cuts inherently provide for access and error recovery points in programs, since the first reference picture in the new scene is encoded without reference to any previous picture (i.e., it goes 'intra'.) Because scene changes occur at unpredictable intervals, a progressive refresh approach can be taken to ensure that a decoder is fully synchronized with the encoder within a deterministic period for error recovery. In this method, a group (either spatially contiguous, for instance 3 macroblock rows or, preferably, a pseudo-random group) of blocks is sent without filtering on some or all pictures. In the example of "refreshing" three macroblock rows each picture, a decoder which tunes into a broadcast channel could be fully synchronized with the encoder within 1 second of the channel change in the worst case.

In one preferred embodiment, the encoding system with loop filtering is implemented using a pipelined architecture. In the pipelined architecture, each processing block shown in FIG. 3 operates on a different image frame in the input video sequence in parallel. The parallel processing will be described in reference to FIGS. 5–7.

FIG. 5 is a table showing each stage of the encoding system pipeline during the processing of a portion of a video sequence with two B-pictures. The letter "I" represents an I-frame, "P" represents a predicted frame, "B" represents a B-frame, and the number following the letter is the frame number of the image. Motion estimation is performed in encode order, while temporal loop filtering is performed in display order because temporal loop filtering is inherently a display order process.

Figure 6:
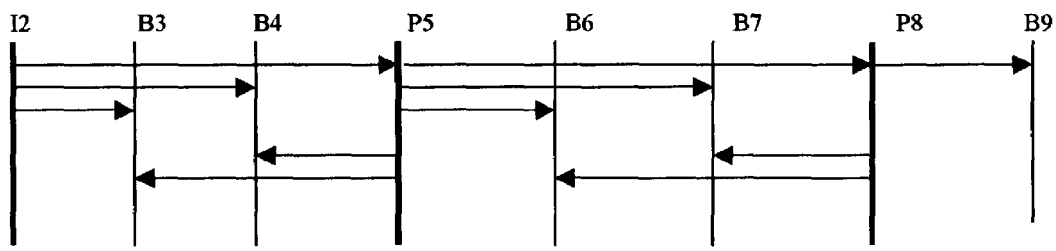
FIG. 6 is a block diagram illustrating the display order of frames.

For reference, FIG. 6 is a block diagram illustrating the display order of frames 2–9, where the arrows denote P and B picture motion compensation directions for encoding.

Figure 7:
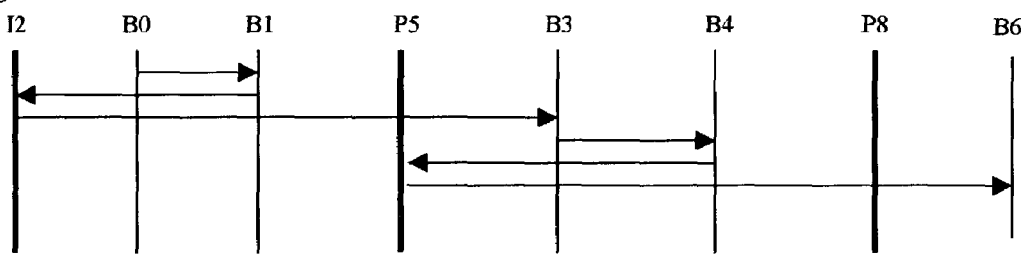
FIG. 7 shows both the encoding order and the filtering order of the frames.

FIG. 7 shows both the encoding order and the filtering order of the frames. The top row of FIG. 7 corresponds to the "Encoding" column of FIG. 5, while the bottom row corresponds to the "Loop TF" column of FIG. 5. P14 in the bottom row is from a previous GOP. The example shows a reference distance of 3 (M=3) and intra distance of 15 (N=15). B-picture encoding is re-ordered until after the encoding of the future reference picture. Filtering of reference picture "K-M" occurs during encode of reference picture "K" (see FIG. 5). According to the present invention, all forward in time prediction (i.e., where the reference picture is earlier in the image sequence and the target image is later) are encoded from filtered reference images. All backward in time prediction is from unfiltered images.

Figure 8:
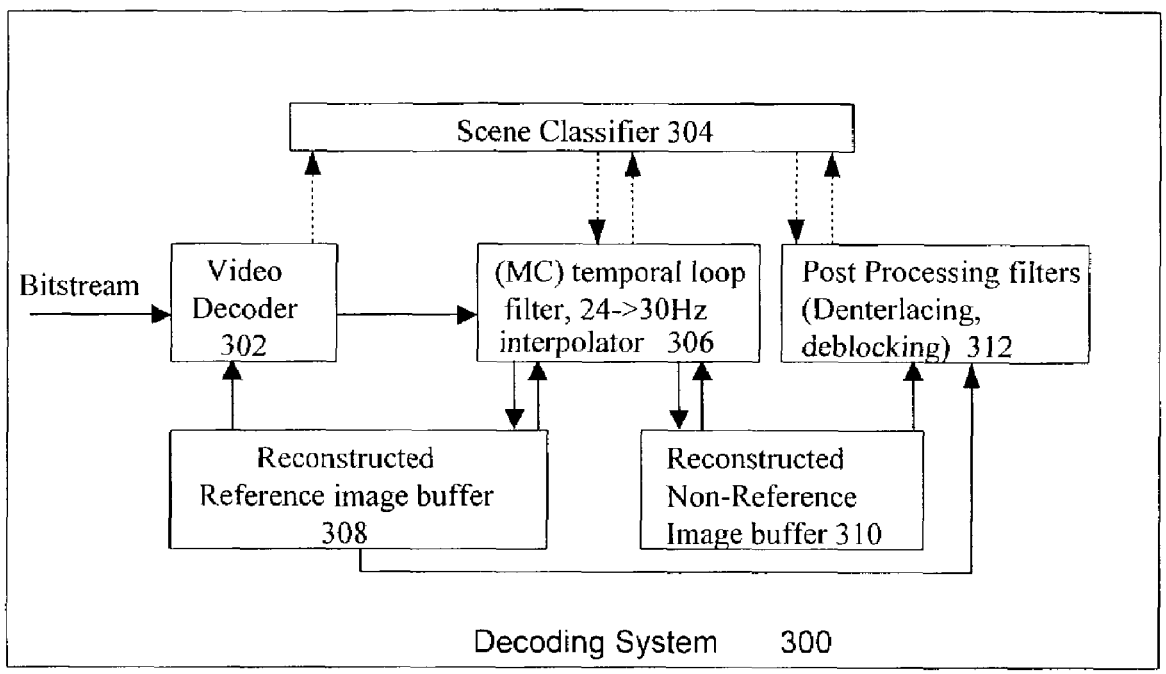
FIG. 8 is a block diagram illustrating a decoder system with a content adaptive temporal loop filter and a scene classifier in accordance with one preferred embodiment of the present invention.

FIG. 8 is a block diagram illustrating a decoder system with a content adaptive temporal loop filter and a scene classification system in accordance with one preferred embodiment of the present invention. The decoder system 300 includes a video decoder 302, a scene classifier 304, a motion compensated temporal filter 306, a reconstructed reference image buffer 308, a reconstructed non-reference image buffer 310, and post processing filters 312. The decoder 302, the content adaptive temporal loop filter 306, and the reconstructed image buffers 308 and 310 are in a loop, meaning that the temporal loop filter 306 writes filtered images into the reconstructed reference image buffer 308. The video decoder 302 then uses the filtered images as reference images for the decoding of predicted images.

As in the encoding system 200, the scene classifier 304 first classifies the scene, analyzes its content, and applies a set of rules to the results of the classification and the content analysis to adapt the characteristics of the temporal loop filter 306. The classification and content information may be extracted from the bitstream or extracted from the decoded images.

In a preferred embodiment, however, the video decoder 302 utilizes MCTF vectors conveyed in bitstream for error concealment and recovery. That is, a bitstream error even in an intra picture can be largely concealed by using the temporal loop filter vector to replace the pixels lost to that error. Note that these are not concealment error vectors as in MPEG2 in that they may refer to a 'B' picture and not the previous forward reference picture for M>1.

Note that either the MC temporal filter 306 or the video decoder 302 may generate 24 Hz to 30 Hz interpolated frames that can be used for film 'judder' reduction. As stated above, besides the motion vectors being loop MCTF vectors conveyed in the bitstream, the encoder may convey a single pan vector to the decoder for judder interpolation. This eliminates the need for a motion estimation unit in the decoder. Similarly, the bitstream can also be used to convey scene classification information.

As described above, the decoding system 300 of FIG. 8 preferably utilizes normative motion compensated temporal loop filtering for error concealment. However, the decoder system may alternatively utilize non-normative motion estimation and compensation for error concealment, as shown in FIG. 9.

Figure 9:
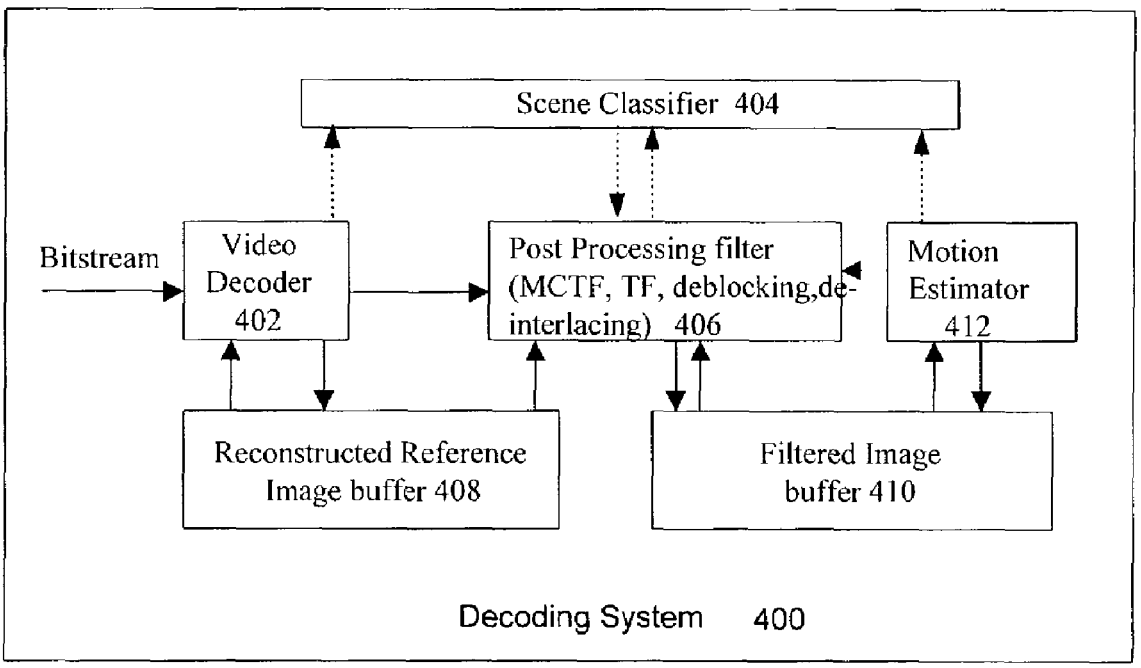
FIG. 9 is a block diagram illustrating a decoder system with post processing filters and a scene classifier in accordance with another preferred embodiment of the present invention.

FIG. 9 is a block diagram illustrating a decoder system 400 with post processing filters and a scene classifier in accordance with another preferred embodiment of the present invention.

In contrast to the system of FIG. 8, the temporal filter 406 is out of the loop, meaning that it does not write filtered images into the reconstructed reference image buffer 408. It may still draw images from that buffer, however. The video decoder 402 decodes the images and writes them into the reconstructed reference image buffer 408. The temporal filter 406 writes filtered images to a filtered image buffer 410, which is then accessed by a motion estimator 412. The motion estimator 412 can be used in MCTF and MC de-interlacing to provide motion information to the scene classifier 404 for the identification of film pan scenes and interpolation displacement vector to correct 24 HZ –>30 Hz motion judder.

The scene classification information may either be carried in the input bitstream or determined by the decoder system 400 from spatial and temporal analysis within the video decoder 402 and (MC) temporal filter units 406, or by a separate scene analysis task (not shown). The scene is classified, and transitions and cuts identified and control information is sent back to the temporal filtering unit. Any or all filters may be adjusted in response to the scene classifier 404 control input. Other decoder operations such as image scaling for aspect ratio conversion (16:9, pan & scan, and letterbox conversion) are omitted for simplicity. Note that the filter can run either before or after aspect ratio conversion or deblocking.

The advantage of the decoding system 400 of FIG. 9 is that with the temporal filtering being outside the decoding loop, the decoding system 400 may be easily incorporated into existing networks to reduce artifacts in video sequences.

The job of encoders, in general, is to attempt to compress the video stream as efficiently as possible, with minimum artifacts. Decoders, in contrast, have had no role in artifact suppression, other than error concealment. Another aspect of the present invention is to provide a decoding system that attempts to reduce the compression artifacts that may have been introduced by the encoder and video distribution chain and to modify the content of the decoding video signal in a way that is appropriate for the display being used. Because altering content is risky, the present invention provides for intelligent decoding systems that only alter the content of the video under user control or if the size of the display is above a predefined threshold. Otherwise, the presence of artifacts may not be as visible and therefore wouldn't make a difference if they are displayed. The decoder systems described with reference to FIGS. 8 and 9 are therefore best implemented in a system where the decoder is aware of the display system's characteristics. For instance, the user could indicate the display type to the decoding system, preferably via an on-screen menu, or devices can identify themselves, e.g., as is possible over IEEE1394 or DVI.

The present invention has been described in accordance with the embodiments shown, and one of ordinary skill in the art will readily recognize that there could be variations to the embodiments, and any variations would be within the spirit and scope of the present invention. In addition, the encoding and decoding systems may be implemented in hardware or in software that executes on processor. Accordingly, many modifications may be made by one of ordinary skill in the art without departing from the spirit and scope of the appended claims.

What is claimed is:

1. A method for reducing artifacts in a video sequence of image frames, the method comprising the steps of:
   (a) classifying scenes in the sequence of image frames;
   (b) analyzing content of the image frames;
   (c) performing temporal filtering on the image frames; and
   (d) applying a set of rules to results of the classification and the content analysis to adapt characteristics of the temporal filtering for the scene.

2. The method of claim 1 further including the step of utilizing any combination of spatial, temporal, and motion metrics for scene classification into scene types.

3. The method of claim 2 further including the step of detecting scene transitions and adapting the behavior of the temporal filter at and across the transitions.

4. The method of claim 2 further including the step of adapting behavior of at least one additional processing filter, including a motion compensated de-interlace filter, a spatial deblocking filter, and a motion compensated error concealment filter.

5. The method of claim 1 further including the step of performing temporal filtering in an encoding system.

6. The method of claim 5 further including the step of performing temporal filtering within an encoding loop to reduce encoding artifacts.

7. The method of claim 6 further including the step of applying temporal filtering within the encoding loop for video compression schemes without B-frames.

8. The method of claim 6 further including the step of applying temporal filtering within the encoding loop for video compression schemes having B-frames.

9. The method of claim 6 further including the step of applying motion compensated temporal filtering (MCTF) within the encoding loop.

10. The method of claim 6 further including the step of applying motion compensated temporal filtering (MCTF) within the encoding loop for M=1 compression.

11. The method of claim 6 further including the step of applying MCTF within the encoding loop for compression with B-frames.

12. The method of claim 6 further including the step of applying progressive refresh on motion compensated temporal filtering (MCTF) for error recovery.

13. The method of claim 6 further including the step of varying strength of the temporal loop filter according to scene type.

14. The method of claim 6 further including the step of sending MCTF vectors in an encoded bitstream generated for the video sequence for ioop temporal filtering by a decoder.

15. The method of claim 6 further including the step of specifying a motion vector search and compensation algorithm for decoding without conveying vectors in an encoded bitstream.

16. The method of claim 6 further including the step of deriving vectors for temporal filtering from other motion vectors, including concealment or MPEG B-frame and P-frame compression motion vectors.

17. The method of claim 6 further including the step of performing bi-directional temporal filtering in video post processing.

18. The method of claim 6 further including the step of conveying a pan vector for bi-directional prediction to a decoder for 24 Hz to 30 Hz temporal interpolation for judder reduction.

19. The method of claim 18 further including the step of conveying scene classification information indicating whether the current scene is a pan.

20. The method of claim 1 further including the step of performing temporal filtering in a decoding system.

21. The method of claim 20 wherein the decoding system utilizes non-normative motion estimation and compensation for error concealment.

22. The method of claim 20 further including the step of performing temporal filtering within a decoding loop.

23. The method of claim 22 wherein the decoding system utilizes motion estimation for bitstream error concealment.

24. The method of claim 22 wherein the decoding system utilizes MCTF vectors conveyed in a bitstream for error concealment and recovery.

25. The method of claim 22 further including the step of extracting classification and content information from an encoded bitstream.

26. The method of claim 20 further including the step of performing 24 Hz to 30 Hz frame interpolation for film judder reduction.

27. The method of claim 20 further including the step of extracting loop MCTF vectors from the bitstream.

28. The method of claim 20 further including the step of extracting classification and content information from images decoded from an encoded bitstream.

29. The method of claim 28 further including the step of extracting a pan vector from the bitstream for judder interpolation.

30. An encoding system, comprising:

a motion estimator for estimating motion trajectories in image frames;

a video encoder for encoding the image frames;

a temporal loop filter coupled between the motion estimator and the video encoder for performing temporal filtering on the image frames to create filtered images; and a scene classification system coupled to the motion estimator and the temporal loop filter for analyzing content of the image frames to classify scenes in the image frames, the scene classification system further functioning to apply a set of rules to results of the classification to adapt characteristics of the temporal filtering performed by the temporal loop filter, thereby reducing encoding artifacts in the filtered images.

* * * * *